United States Patent Office 3,075,961
Patented Jan. 29, 1963

3,075,961
RECONSTITUTION OF NATIVE COLLAGEN FIBER FROM ACID PRECURSOR GELATIN
Arthur Veis, Skokie, and Jerome Cohen, Chicago, Ill., assignors, by mesne assignments, to Armour & Company, a corporation of Delaware
No Drawing. Filed Apr. 5, 1960, Ser. No. 20,038
3 Claims. (Cl. 260—123.7)

This invention relates to collagen. Particularly it relates to the reconstitution of native collagen fibers from selected water soluble disorganized high-molecular weight gelatins, and to the reconstituted fibers.

Native collagen which occurs mainly in animal connective tissues such as skin and tendons consists of fibers exhibiting a typical striated or banded structure with an axial periodicity of 640 A. (A.=1 Angstrom unit=$1 \times 10^{-8}$ cm.) when viewed in the electron microscope.

Collagen fibers consist of fibrils or bundles of single peptide chains, protofibrils, which are organized into highly oriented three-chain coils. A variety of rather mild thermal and chemical treatments denature native collagen.

A soluble collagenous protein known as procollagen or tropocollagen can be extracted from animal connective tissue by acid at low temperatures. Schmitt et al. discovered in 1942 (J. Cellular Comp. Physiol. 20:11) that it was possible to reconstitute collagen fibrils from a solution of the low temperature acid soluble tropocollagen portion of animal tissue. The tropocollagen molecules exist in solutions as the three chain coiled rods of peptide chains. Upon neutralization or salting out of such a solution, these molecules reaggregate into fibers possessing identity periods and the fine structure characteristic of native collagen.

Most native collagens, unlike tropocollagen, are not acid soluble at low temperatures. Heat must be applied to put the collagen into solution, but this treatment melts out the collagen structure and yields water-soluble gelatin. During this melting the collagen fibers are broken up into single peptide chains or protofibrils, each chain having a disorganized random-coil configuration. Heretofore the universal experience wtih gelatin has been that the degradation of collagen molecules into disorganized single chain protofibrils is irreversible, there being no recognized method for reorienting the disorganized chains back to the complete native collagen structure.

We have discovered that melting of the collagen structure may be controlled so as to produce peptide filaments consisting of disoriented networks of single peptide chains which are cross-linked together. By a certain process disorganized networks may be reorganized to form fibers exhibiting the properties of native collagen.

A primary object of this invention is to provide a novel method for reconstructing collagen fibers from solutions of cross-linked gelatins. A second object is to provide collagen fibers having increased reactivity, and which are amenable to chemical and physical manipulation to provide new and superior types of collagenous products. This invention has the important advantage of utilizing collagenous scrap and low quality leather stock as a source of high quality manipulatable collagen stock. Other objects and advantages will appear as this specification continues.

Our invention provides a novel method for utilizing collagen, collagenous waste material, hide scrap, and the like as a source of valuable native collagen fibers. These fibers may be spun into threads, molded into sheets, or fabricated into other forms. Glue or gelatin stock may be treated to obtain therefrom the molecular species used in the present process. After extraction of the molecular species that can be reconstituted, the residue of the stock can be further treated to extract usual gelatin or glue of commerce.

Reconstituted collagen fibers of this invention have many desirable properties not found in native collagen. Extracted fibers of the present invention because of their physical state of dispersion react with various reagents more readily and completely. They are apparently more reactive than native collagen fibers due to their smaller diameter and the ease with which various reagents penetrate their interstices. Our reoriented collagen fibers may be used to build leather and other products having desired properties making production of new leather-like products possible. Our fibers may be extruded into threads which after tanning yield high quality ligatures and textile fibers.

Although any animal tissues containing high levels of collagen are suitable as starting material for the practice of this invention, we prefer to employ mammalian corium. Skins, hides, ossein, reticular tissue and tendons are examples of suitable collagenous starting materials. It is important that the collagen used as a starting material comes from a source which has never been subjected to liming treatment.

The collagenous raw material should be subjected to a certain degree of purification. Substantially all fat, dirt, flesh, and the like should be removed from the collagen before gelatin extraction. Soaking hides in 10% sodium chloride solution followed by thorough washing to remove most of the salt is a simple and satisfactory purification method.

Typically the process of this invention includes heat and acid extraction of high molecular weight gelatin from collagen, followed by acid contacting of the cooled gelatin, removal of the acid from the gelatin to thereby cause fiber formation in the gelatin, and separation of the fibers from the gelatin.

The gelatin from which collagen fibers may be reconstructed can be described as high molecular weight cross-linked acid-precursor gelatins having a weight average molecular weight of above about 200,000. Gelatin of this description may be extracted from collagen by heating the collagen to temperatures of from about 50° C. to about 80° C., at pH's of from 6.6 to 2.2, for times ranging from about 1 to 3 hours. We prefer to extract the gelatin by heating a collagen slurry to 60° C. at pH 6.0 for about 1 hour. Preferably a mineral acid such as hydrochloric acid is used to acidify the collagen, but other suitable acids may be employed.

Although we prefer not to do so, lower temperatures as from about 30 to 60° C., may be used during gelatin extraction provided a rather concentrated solution of a hydrogen-bond competing water soluble material is added to the collagenous raw material. Examples of suitable solutions of this description include 4 to 6 molar urea and 2 molar potassium or sodium thiocyanate.

Following extraction, the high molecular weight gelatin is cooled to below about 10° C. and contacted with the water solution of an organic acid which is also at a temperature of below about 10° C. Examples of suitable organic acids are acetic, citric, glycolic and propionic. The concentration of the acid solution may suitably be within the range of about 0.05 to 0.2 M. We prefer to use acetic acid having a concentration of about 0.15 M, or 0.1 M citric acid solution.

We may use one of several methods for contacting the gelatin by the cold organic solution. Preferably we add the acid solution directly to the chilled gelatin. We may, however, first dissolve the gelatin in a warm salt solution and dialyze this gelatin solution against the cold organic acid solution. This alternate procedure ultimately yields collagen fibers which have the typical 640 A. banding of native collagen but in addition have unusually small diameters.

The length of time necessary for the acid treatment of the gelatin is largely dependent upon the technique employed and the form of the gelatin at time of acidification. For example, the gelatin solution after extraction from collagen may be almost instantaneously acid treated by direct mixing with the organic acid solution. On the other hand, dialyzing acid into gelatin dissolved in salt solution is a lengthy process requiring as much as 24 hours. If it is in a dehydrated form at time of acidification, a few hours are required to allow proper swelling of the gelatin.

In our alternate acid procedure the gelatin may be dissolved in the solution of any simple 1–1 salt such as potassium chloride, sodium chloride, potassium iodide, cesium chloride, and so on. Any concentration of from about 0.01 M to 1 M is operable but higher concentrations make it more difficult to later remove the salt. We prefer to use a potassium chloride solution of about 0.1 M. After dissolving the gelatin in the salt solution it may then be dialyzed at a temperature of from about 0° to about 10° C. against the organic acid solution. Dissolving the gelatin in salt solution prior to acidification makes it possible to increase the concentrations of gelatin solution.

The acid-contacted gelatin, after swelling in the case of direct acid contact or after several hours dialysis in the case of the alternate acid method, is then washed substantially free of the acid. Removal of acid may be accomplished by dialysis or filter pressing. Preferably, the acidified gelatin is dialyzed against cold water until the acid is substantially removed. Temperatures of below about 25° C. should be used. Preferably a water temperature below about 10° C. is maintained to inhibit the growth of mold. In no instance should the water temperature be high enough to cause denaturation of the high molecular weight cross-linked peptide filaments.

Removal of acid causes collagen-like fibers to form in the gelatin. These fibers may be collected by gravity settling, or mechanical separation such as centrifugation. The fibers collected from the substantially acid-free gelatin have the typical cross-striated structure of 640 A. average when viewed in the electron microscope. They dissolve in boiling water to yield gelatin. In addition, the reconstituted fibers of this invention possess all the characteristics of tropocollagen, viz., they dissolve in cold acid solutions.

The tropocollagen-like characteristics of reconstituted collagen are highly desirable from the standpoint of commercial processing. Fibers stored in a dried or refrigerated form may be easily and readily dissolved in cool acid solution with heat treatment at time of fabrication or other processing.

This invention may be more fully understood by referring to the following examples.

*Example I*

A piece of fresh steer hide was washed with cold water. The adhering fat and muscle were mechanically removed. Non-collagenous soluble proteins were extracted with 10% NaCl. The hair was clipped off. The shaved pieces were cut into small cubes, 1 cm. on edge, and washed with distilled water. The cubes were then slurried in 10 volumes of water. Gelatin was then extracted by raising the temperatures to 60° C., adjusting the pH of the slurry to 6.0 with HCl, and stirring the slurry vigorously for 1 hour. After filtering, the clear solution was found to contain gelatin having a weight average molecular weight of 1,000,000 by light scattering measurement. This gelatin was dried and used for the reconstitution steps.

The dried gelatin was swollen in 0.1 M acetic acid at 4° C. overnight, after which the gel mass was transparent. Slow dialysis, without agitation, against cold tap water raised the pH. When the pH reached above 4.5 the gel began to become turbid and slowly took on the appearance of a fibrous mass. After 24 hours of dialysis, fibers appeared within the dialyzed material. These fibers have the typical cross-striated 640 A. periodicity of collagen when viewed in the electron microscope. These fibers could be redispersed in acetic acid, at temperatures of less than 35° C., and had all the properties of tropocollagen.

*Example II*

Fresh steer hide was prepared, gelatin extracted and the gelatin dried, as in Example I. The dried gelatin was dissolved at 40° C. in 0.1 M KCl, this solution was chilled and then dialyzed against 0.15 M acetic acid until chloride free. The acetic acid was then dialyzed out slowly against tap water.

The solution became turbid at pH 4.5 and fibers soon precipitated. Electron microscope examination revealed that the fibers although having the usual 640 A. banding of collagen were thinner than those obtained in Example I. They were easier to redissolve in acid.

*Example III*

Fresh bull hide was prepared and cubed, as in Example I. Extraction of the high molecular weight gelatin was carried out at 80° C. Fibers were reconstituted from the gelatin as in Example I.

*Example IV*

Steer hide was prepared and cubed as in Example I. The acid extraction of the cubes was carried out at 40° C. in a solution of 2.0 M KCNS. Fibers were obtained from the gelatin as in Example I.

*Example V*

Hide was prepared as in Example I. The gelatin extraction of the cubes was carried out at 40° C. in a solution of 6.0 M urea. Fibers having 640 A. banding were reconstituted as in Example I.

While in the foregoing specification we have set out steps of our invention in considerable detail for the purpose of illustration, it will be understood that such details of procedure may be varied widely by those skilled in the art without departing from the spirit of the invention.

We claim:

1. The process of preparing reconstituted collagen fibers, characterized by extracting native collagen in water at a temperature within the range from 50 to 80° C. and at an acidic pH to obtain high molecular weight cross-linked acid-precursor gelatin, and precipitating a substantial portion of said acid-precursor gelatin from an acidic aqueous solution thereof to obtain collagen fibers having the typical 640 A. banding of native collagen.

2. The process of claim 1 wherein said extraction is carried out at a pH within the range from 2.2 to 6.6.

3. The process of claim 1 wherein said extraction is carried out at a temperature of around 60° C. and at a pH of around 6.0.

References Cited in the file of this patent

UNITED STATES PATENTS 2,935,413     Veis et al. _____ May 3, 1960

OTHER REFERENCES

Veis et al.: J.A.C.S. 76 (2476–78), 1954.
Veis et al., Ibid., 77 (2364–68), 1955.
Veis et al.: Ibid., 77 (2368–74), 1955.
Boedtker et al.: Ibid., 78 (4267–80), 1956.